INVENTOR.
HERBERT E. TRACY
BY John O. Evans, Jr.
ATTORNEY

Sept. 1, 1970  H. E. TRACY  3,526,408

MECHANICAL SEAL CONSTRUCTION

Original Filed July 6, 1965  2 Sheets-Sheet 2

INVENTOR.
HERBERT E. TRACY
BY John O. Evans, Jr.
ATTORNEY

United States Patent Office 3,526,408
Patented Sept. 1, 1970

3,526,408
MECHANICAL SEAL CONSTRUCTION
Herbert E. Tracy, Alhambra, Calif., assignor to Borg-Warner Corporation, Chicago, Ill., a corporation of Illinois
Continuation of application Ser. No. 469,700, July 6, 1965. This application Jan. 2, 1969, Ser. No. 791,859
Int. Cl. F16j 15/36
U.S. Cl. 277—88                               4 Claims

ABSTRACT OF THE DISCLOSURE

A mechanical seal for sealing a rotary shaft to a housing having a rotary sealing ring on the shaft and a complementary, axially movable, stationary sealing ring on the housing. A spring, such as a bellows, is compressed between the stationary ring and an axially adjustable adapter ring carried by the housing for urging the stationary ring towards the rotary ring. Lubricating fluid is injected between the sealing faces of the sealing rings through a fluid conduit including a flexible portion extending from the adapter ring to the stationary sealing ring.

---

This application is a continuation of application Ser. No. 469,700, filed July 6, 1965, and now abandoned.

This invention relates to mechanical seals.

In conventional centrifugal pumps, the impeller shaft extends through an opening in the pump housing and is rotated by a motor external to the housing. A mechanical seal may be employed for rotatably sealing the shaft to the housing to prevent the flow of fluid from the housing outwardly through the space between the shaft and the shaft opening. Such a mechanical seal has a rotary sealing ring or element fixed to and sealed to the shaft for rotation with the latter. A stationary or nonrotary sealing ring has a radial sealing face opposed to a cooperating radial sealing face on the rotary sealing ring. The stationary sealing ring is sealed to the housing. One of the sealing rings is movable axially with respect to the shaft and is biased by spring means or the like into sealing relationship with the other ring. In operation, the liquid within the pump housing, which is under high pressure, flows at a low rate from the interior of the housing outwardly between the opposed sealing faces of the sealing rings to form a thin film of liquid between the sealing faces. This film of liquid lubricates and cools the sealing faces. During periods when the pump is not operating, the thin film of liquid may be lost from between the sealing faces, leaving the latter in direct contact with each other with no lubricating liquid between them. When the pump is started under these conditions, the sealing faces rub against each other in a dry state for the first few revolutions of the shaft, causing undue wear of the faces.

It is an object of this invention to provide a mechanical seal wherein lubricating fluid can be introduced between the sealing faces prior to start-up of a device embodying the seal.

Mechanical seal arrangements have employed a metal bellows to seal a nonrotary sealing ring to a housing. The metal bellows is under axial compression between the sealing ring and the housing and serves to preload the sealing ring and press it into sealing relationship with a complementary rotary sealing ring. Relative rotation of the sealing rings exerts a torque which twists the bellows, distorting it and affecting the force with which it presses the fixed sealing ring towards the rotary sealing ring.

Thus another object of the invention is to provide a mechanical seal having a bellows as aforesaid and wherein the undesirable torque referred to is counteracted.

In mechanical seals employing bellows, normal wear of the sealing surfaces of the sealing rings, manufacturing tolerances, end-play of the shaft, and the like, cause variations in the position of the nonrotary sealing ring with respect to the housing and corresponding variations in the length of the bellows, thus varying the axial force exerted by the bellows on the nonrotary sealing ring.

Therefore, it is a further object of this invention to provide a mechanical seal wherein the bellows may be adjusted to compensate for the variations referred to.

Briefly, the invention involves a mechanical seal including a housing adapted to contain a fluid to be sealed and having a shaft opening through it; a rotatable shaft extending through the opening; a rotary sealing ring carried by and sealed to the shaft; an axially movable, rotationally stationary sealing ring disposed axially outwardly from the rotary sealing ring; the rings having opposed sealing faces extending transversely to the axis of the shaft; cooperative key means on the housing and the stationary sealing ring to restrain the latter from rotation but allowing it to move axially; an adapter ring disposed axially outward from the stationary ring and slidably mounted on the housing with means for slidably sealing it to the housing; a resilient bellows member surrounding the shaft and sealingly affixed to the adapter ring and stationary ring for resiliently urging the latter toward the rotary ring; means for sliding the adapter ring to various axial positions in the housing to vary the axial force exerted by the bellows on the stationary ring; means for injecting lubricating fluid into the zone between the sealing faces including a fluid conduit extending between and fixed to the adapter and stationary rings, the conduit having a flexible portion so as to permit independent axial movement of the adapter ring and stationary ring; means for establishing a passage for the lubricating fluid from the housing into the adapter ring and to the fluid conduit including: a fluid passage formed in the housing and communicating with a source of fluid, a fluid passage formed in the adapter ring communicating with the fluid conduit fixed to the adapter ring, means defining an annular slot formed about the outer periphery of the adapter ring in fluid communication with the fluid passage in it, the adapter ring being disposed with the slot in fluid communication with the fluid passage formed in the housing, the slot having an axial width insuring communication between it and the passage in the housing in the various positions of the adapter ring in the housing.

The present invention also resides in apparatus for mechanically sealing a rotary shaft to a wall member having an opening through which the shaft extends, the wall member separating a high-pressure fluid on one side thereof from a low-pressure fluid on the opposite side thereof, the apparatus having a stationary sealing ring carried by and sealed to the wall member, a rotary sealing ring carried by and sealed to the shaft, a generally radially extending sealing surface on one of the rings, another generally radially extending sealing surface on the other of the rings, the sealing surfaces being in relatively rotatable sealing relation with each other along a generally annular sealing interfacial zone having its outer and inner peripheries exposed to the fluids on the opposite sides of the wall member, at least one of the rings being axially movable, means for biasing the axially movable ring towards the other ring, and means for injecting lubricating fluid into the interfacial zone including means providing a bore extending through one of the rings, the bore having an inlet end terminating in a surface of the ring external to the interfacial zone and a discharge end terminating in the sealing surface of the ring between the inner and outer peripheries of the interfacial zone for discharging lubricating fluid into the interfacial zone, wherein the improvement comprises means including a pump for delivering lubricating fluid to the inlet end of said bore, motor means actuated by the high-pressure fluid, and means drivingly connecting said motor means to said pump for operating said pump to deliver lubricating fluid to the inlet end of the bore and forcing the lubricating fluid through said bore and into the interfaical zone.

The invention will be described with greater particularity, and other of its aims, objects, and advantages will be apparent from or set forth in the following detailed description of one embodiment of the invention taken with the accompanying drawings in which.

Figure 1:
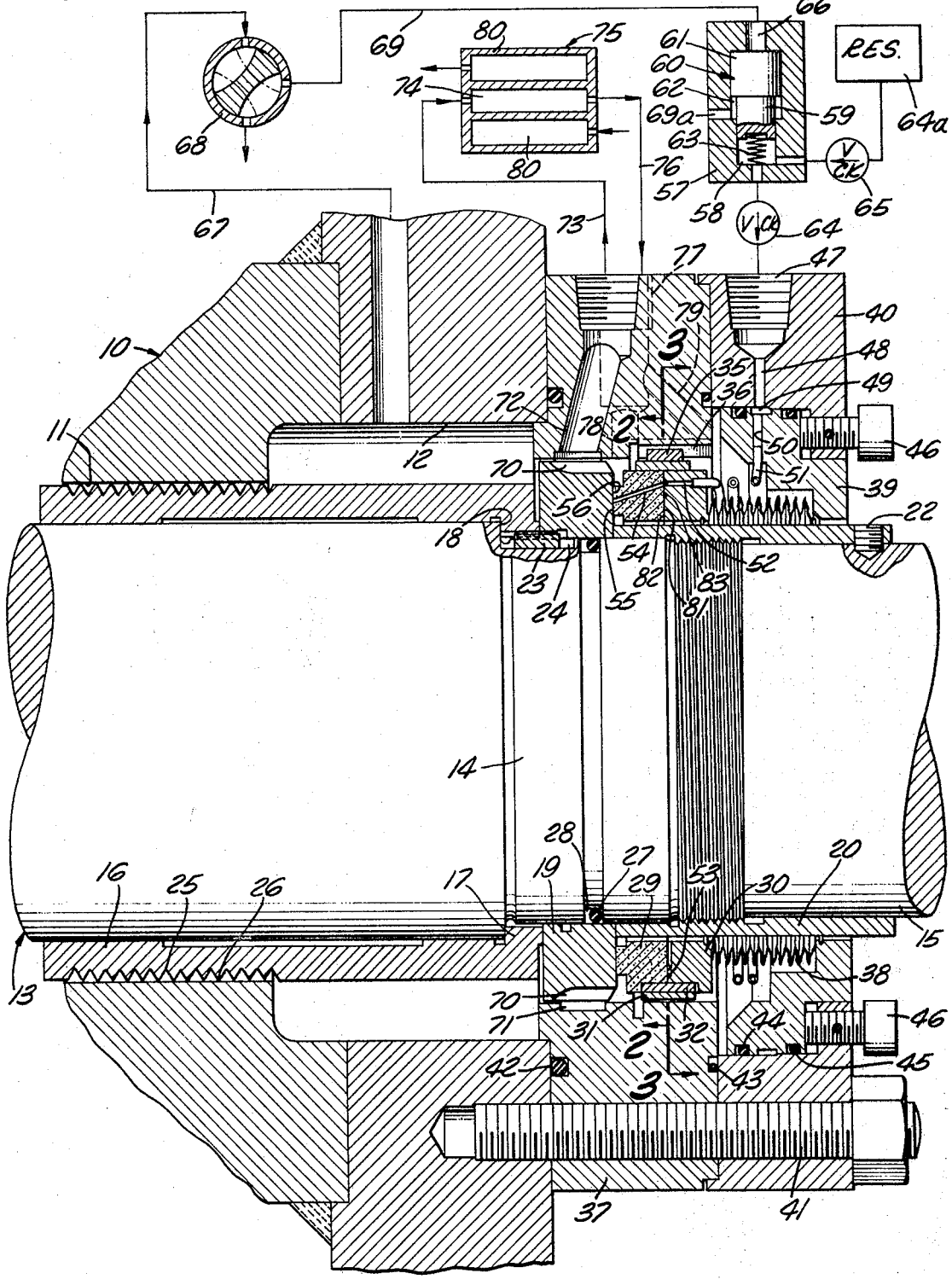
FIG. 1 is an axial sectional view of a portion of a pump housing showing an illustrative mechanical seal in accordance with the invention together with associated equipment, this view being taken along the line 1—1 of FIG. 2 or FIG. 3 looking in the direction of the arrows.

Referring to the drawings, the reference numeral 10 designates generally a housing, such as a centrifugal pump housing, having a shaft opening extending therethrough, the opening including a restricted bore 11 and an enlarged bore 12. A shaft 13 extends through the opening in the housing. A centrifugal pump impeller (not shown) may be mounted on the left-hand end of the shaft as seen in FIG. 1, and a driver (not shown), such as an electric motor, may be drivingly connected to the righthand end of the shaft.

The shaft has a reduced portion 14 and a still further reduced portion 15. A sleeve 16, having an inturned flange 17, is mounted on the shaft with the flange 17 in abutment with a shoulder 18 on the shaft, A rotary sealing ring 19 is mounted on the reduced shaft portion 14 with the inner face of the sealing ring in abutment with the flange 17 of the shaft sleeve, A nut 20 is threaded to the shaft by threads 21 and is screwed into engagement with the outer face of the sealing ring 19 to retain the latter in place by clamping it between the flange 17 and the retaining nut. The retaining nut is secured against becoming loose by a set screw 22. The shaft sleeve 16 and the rotary sealing ring 19 are prevented from rotating with respect to the shaft by a key 23 received in a keyway 24 in the shaft and in the complementary opposed keyways in the flange 17 of the shaft sleeve and in the rotary sealing ring.

The shaft sleeve 16 is provided with a plurality of parallel, circumferential grooves 25 forming V-shaped ridges 26. The outer peripheries of these ridges lie adjacent to the restricted bore 11 of the housing, and form with the bone a labyrinth seal that restricts or limits outward flow of fluid from the interior of the housing 10, through the clearance between the shaft sleeve 16 and the restricted bore 11, and into the enlarged bore 12.

In a groove 28 in the reduced portion 14 of the shaft is an O-ring 27 for preventing flow of fluid outwardly along the shaft and between the rotary sealing ring 19 and the reduced portion of the shaft.

The shaft 13 is journaled in suitable bearings (not shown), as is conventional.

Figure 2:
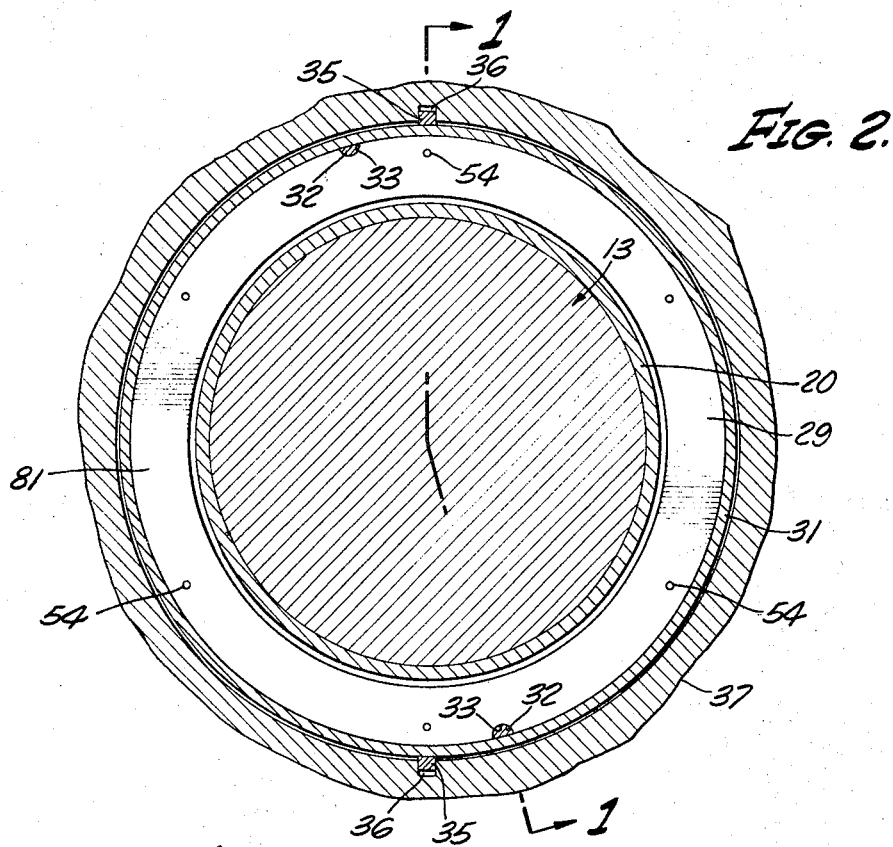
FIG. 2 is a transverse sectional view taken along the section line of FIG. 1 looking in the direction of the arrows 2—2.
Figure 3:
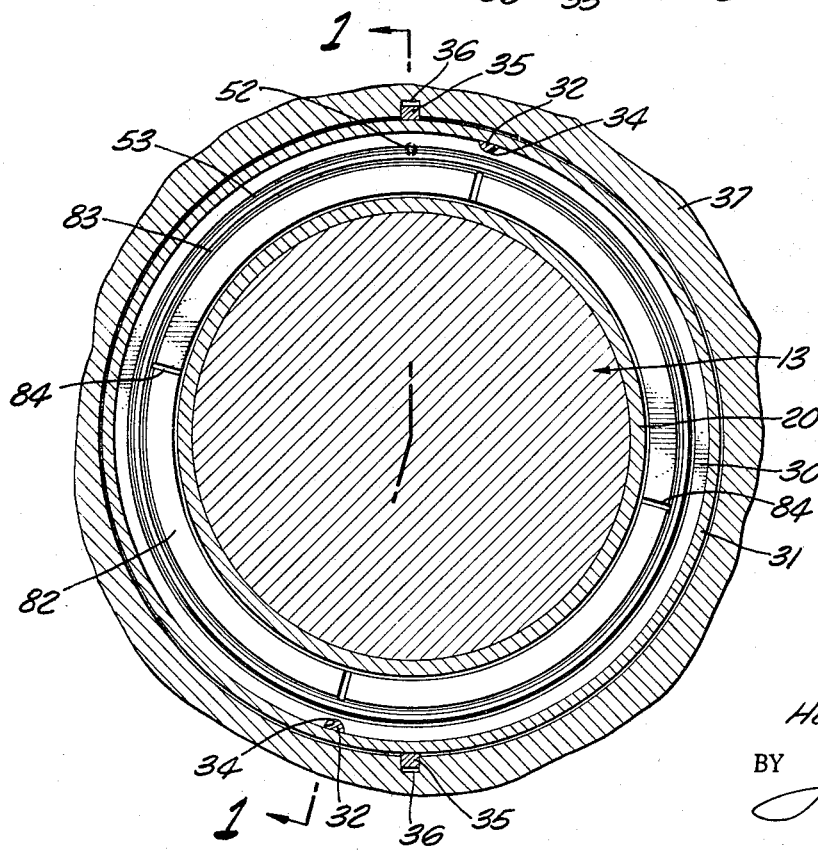
FIG. 3 is a transverse sectional view taken along the same section line of FIG. 1 looking in the direction of the arrows 3—3.

A stationary or nonrotary sealing ring 29 is arranged in sealing relation to the rotary sealing ring 19. The fixed sealing ring is mounted upon a backing ring 30 by means of a mounting ring 31 that encircles both the stationary sealing ring and the backing ring. As best seen in FIGS. 2 and 3, the mounting ring 31 has a pair of diametrically disposed, axially arranged keys 32 that are received in slots 33 in the fixed sealing ring 29 and aligned slots 34 in the backing ring 30. Extending radially outwardly from the mounting ring 31 is a pair of keys 35 that are diametrically disposed and that are received in keyways 36 in a flange 37. With this construction, the fixed sealing ring 29 is securely mounted upon the backing ring 30 by the mounting ring 31. The keys 32 prevent relative rotation between the fixed sealing ring and its backing ring and mounting ring. The keys 35 prevent relative rotation of the ring assembly with respect to the flange 37.

One end of a metallic bellows 38 is welded to the outer face of the backing ring 30. The other end of the bellows is welded to a bellows adapter 39. The bellows adapter is received within an auxiliary flange 40 which, in turn, is mounted upon the flange 37. Bolts, such as the 41, secure the flange 37 and auxiliary flange 40 to the housing 10. Leakage between the housing 10 and the flange 37 is prevented by an O-ring 42, and leakage between the flange 37 and the auxiliary flange 40 is prevented by another O-ring 43. O-rings 44 and 45 prevent loss of fluid between the auxiliary flange 40 and the bellows adapter 39.

The bellows adapter 39 is axially slidable in the auxiliary flange 40. Adjusting screws 46, 46 are employed to set the bellows adapter at a selected axial position for attaining the desired compression of the bellows 38. Thereby, the nonrotary sealing ring 29 may be preloaded with a desired force to urge it against the rotary sealing ring 19.

Provision is made for injecting lubricating fluid between the opposed sealing faces of the sealing rings 19 and 29. For this purpose, a tapped hole 47 is provided in the periphery of the auxiliary flange 40. Lubricating fluid is conducted from the bottom of this hole through a bore 48 to an annular slot 49 in the periphery of the bellows flange 39. Another bore 50 leads radially inward through the bellows adapter from the slot 49. One end of a continuous length of flexible metal tubing 51 is sealed into the inner end of the bore 50. The metal tubing is coiled about the bellows 38, the other end of the tubing being sealed into an axial bore 52 that extends through the backing ring 30. As best seen in FIG. 3, the inner end of the bore 52 opens into an annular slot 53 formed in the backing ring 30. There is a plurality of longitudinal bores 54 extending through the nonrotary sealing ring 29. Six such bores are appropriate, and this number is shown in FIG. 2 of the drawings. Each of these bores 54 communicates at one end with the annular groove 53 in the backing ring and opens at the other end into the sealing face 55 of the nonrotary sealing ring. Thus, when lubricating fluid under pressure is introduced into the tapped hole 47, it can flow through the bore 48, the groove 49, the bore 50, the flexible metal tubing 51, and into the bore 52 in the backing ring. The lubricating fluid then flows through the bore 52 into the annular groove 53 in the backing ring and thence through the bores 54 into the space between the sealing face 55 of the nonrotary sealing ring and the sealing face 56 of the rotary sealing ring 19.

A typical device for supplying lubricant to the tapped hole 47 includes a cylinder 57 having a bore 58 into which one end 59 of a double-headed piston 60 is slidably fitted. The other end 61 of the piston is of larger diameter than said one end and is slidably fitted in a bore 62. The piston 60 is normally held in its upper position, as illustrated, by a spring 63. The bore 58 of the cylinder is placed in communication with the tapped hole 47 through a check valve 64. A lubricant reservoir 64a communicates with the lower bore 58 of the cylinder through another check valve 65.

In the upper end of the cylinder 57, there is formed a port 66 through which fluid for actuating the piston is admitted. Fluid for operating the piston may be obtained conveniently from the enlarged bore 12 in the housing 10. For this purpose, a conduit 67 leads from the bore 12 to a three-way valve 68. In the dotted line position of the valve, fluid will flow from the conduit 67 through a conduit 69 to the port 66 of the cylinder. When the valve is in the full line position, operating fluid is exhausted from the upper end of the cylinder through the port 66 and the conduit 69. It will be noted that the cylinder 57 has a vent 69a that prevents air from being trapped in the cylinder bore 62 below the piston portion 61.

It is believed that the operation of the device for injecting lubricant between the sealing faces of the mechanical seal rings will be obvious from the foregoing description. In brief, however, when the piston 61 is moved to the illustrated position from a depressed position, lubricating fluid is drawn from the reservoir 64a into the bore 58 through the check valve 65. When the piston is depressed, this lubricating fluid is forced through the check valve 64 into the tapped inlet 47 and thence to the space between the sealing faces 55 and 56 through the channels hereinbefore described.

Movement of the piston 60 downwardly to accomplish this result is under control of the valve 68. When the valve is turned to the dotted line position, pressure fluid from the enlarged bore 12 is admitted to the cylinder above the piston end 61 to force it downwardly. Then, when the valve is turned to the full line position, the spring 63 returns the piston 60 to its upper position to draw another charge of lubricant fluid into the bore 58.

The mechanical seal shown and described herein includes apparatus for cooling the seal. This apparatus forms no essential part of the present invention. For a fuller description of cooling apparatus of this type, reference is made to U.S. Pat. No. 2,824,759, issued Feb. 25, 1958, Herbert E. Tracy, for Liquid Cooled Seal, which patent is assigned to the assignee of the present application. The cooling device includes pump vanes 70 formed in the periphery of the rotary sealing ring 19. As the shaft is turned, these vanes impel fluid from around the sealing rings into an annular channel 71 provided in the flange 37 adjacent to the pump vanes. From this annular channel, fluid is forced outwardly through a bore 72 in the flange and through a conduit 73 to the central section 74 of a heat exchanger 75. Cooled fluid from the central section 74 flows through a conduit 76 to a cool-fluid inlet 77 in the flange 37. The cool fluid is returned to the vicinity of the sealing rings through the conduits 78 and 79. After cooling the sealing rings and adjacent parts, the fluid is recirculated by the pump vanes 70 through the heat exchanger 75. The heat exchanger has an outer section 80, 80 through which a cooling fluid is circulated in indirect heat-exchange relation with the fluid that flows through the central section 74 of the heat exchanger.

The surface 81 of the nonrotary sealing ring 29 that is in contact with the surface 82 of the backing ring 30 is lapped, as is also the surface 82, to provide with the latter a fluid-tight joint. As best seen in FIGS. 1 and 3, this joint includes an annular groove 83 formed in the surface 82 of the backing ring, which annular groove is connected by a plurality of radial grooves 84 with the inner periphery of the backing ring. The annular groove 83 is in communication with the outer atmosphere through the radial grooves 84 and the interior of the bellows 38. By this means, the resultant force exerted by fluid pressure inside the housing that presses the backing ring into fluid-tight contact with the nonrotary sealing ring is concentrated in an annular zone that lies between the annular groove 83 and the outer peripheries of the nonrotary sealing ring 29 and the backing ring 30. Thereby, an improved sealing relation is established between the backing ring and the nonrotary sealing ring. This joint forms no essential part of the present invention. For a fuller description of this type of joint, reference is made to the application of Winfred J. Wiese, for Mechanical Seal, issued Jan. 4, 1966, as U.S. Pat. 3,227,463, which application is a continuation of abandoned U.S. application Ser. No. 83,476, entitled Mechanical Seal, which application was filed Jan. 18, 1961, in the name of Winfred J. Wiese. Both of said applications are assigned to the assignee of the present application.

What is claimed is:

1. A mechanical seal assembly comprising: a housing adapted to contain a fluid to be sealed and having a shaft opening therethrough; a rotatable shaft extending through said opening; a rotary sealing ring carried by and sealed to said shaft; an axially movable, rotationally stationary sealing ring disposed axially outwardly from said rotary sealing ring; said rings having opposed sealing faces extending transversely to the axis of said shaft; cooperative key means on said stationary sealing ring and on said housing restraining said stationary sealing ring from rotation yet permitting it to move axially; an adapter ring disposed axially outwardly from said stationary sealing ring; said adapter ring being axially slidably mounted on said housing; means for slidably sealing said adapter ring to said housing; a resilient bellows member surrounding said shaft and sealingly affixed to said adapter ring and said stationary sealing ring for resiliently urging said stationary sealing ring towards said rotary sealing ring; means for sliding said adapter ring to various axial positions in said housing to thereby vary the force exerted by said bellows on said stationary sealing ring; means for injecting lubricating fluid into the zone between said sealing faces including a fluid conduit extending between and fixed to said adapter ring and said stationary sealing ring at least a portion of said fluid conduit being flexible to permit independent axial movements of said stationary sealing ring and said adapter ring; means establishing a passage for lubricating fluid from said housing into said adapter ring and to said fluid conduit including: a fluid passage formed in said housing communicating with a source of fluid, a fluid passage formed in said adapter ring communicating with said fluid conduit fixed to said adapter ring, means defining an annular slot formed about the outer peripheral surface of said adapter ring in fluid communication with said fluid passage therein, said adapter ring being disposed with said slot in fluid communication with said fluid passage formed in said housing, said slot having an axial width sized to insure communication between said slot and said passage in said housing in said various axial positions of said adapter ring in said housing.

2. A mechanical seal assembly as claimed in claim 1 wherein the axial width of said slot in said adapter ring is greater than the diameter of said passage formed in said housing to accommodate movement of said adapter ring with respect to said housing.

3. A mechanical seal assembly as claimed in claim 1 wherein means are provided for injecting said lubricating fluid between said opposed sealing faces including a bore extending through one of said rings, said bore having an inlet end terminating in spaced relation to said sealing face and a discharge end terminating at said sealing face for discharging said fluid at said sealing faces said means including a pump for delivering said lubricating fluid to the inlet end of said bore through said housing, slot, adapter ring, and conduit member, said pump being adapted for operation by said fluid contained in said housing.

4. A mechanical seal assembly as claimed in claim 3 wherein said pump comprises a first cylinder, a first piston head reciprocably slidable in said cylinder, means for drawing lubricating fluid into said cylinder upon movement of said piston head in one direction, and means for delivering lubricating fluid from said cylinder to the inlet end of said bore upon movement of said piston head in the opposite direction, a second cylinder axially aligned with and of larger diameter than said first cylinder, a second piston head reciprocably slidable in said second cylinder, means for uniting said piston heads to provide a composite piston that is reciprocable as a unit, means for admitting fluid contained in said housing on one side of said wall member into said second cylinder to drive said piston in a direction to deliver lubricating fluid from said first cylinder to the inlet end of said bore, means for moving said piston in the opposite direction, and means for exhausting fluid from said second cylinder upon movement of said piston in said latter direction.

References Cited

UNITED STATES PATENTS

| | | | |
|---|---|---|---|
| 1,950,158 | 3/1934 | Barks | 184—29 X |
| 2,326,824 | 8/1943 | Browne et al. | 277—88 X |
| 2,574,808 | 11/1951 | Wolfe | 277—88 |

FOREIGN PATENTS 632,217  12/1961  Canada.

LAVERNE D. GEIGER, Primary Examiner

J. S. MEDNICK, Assistant Examiner

U.S. Cl. X.R.

277—74, 136